United States Patent [19]

Sancovsky

[11] Patent Number: 4,654,239
[45] Date of Patent: Mar. 31, 1987

[54] FLANGE FOR WINDSHIELDS AND GUARDS OF VEHICLES

[76] Inventor: Marcos J. Z. Sancovsky, Rua das Flexas, 622 - São Paulo, SP., Brazil

[21] Appl. No.: 698,776

[22] Filed: Feb. 6, 1985

[51] Int. Cl.$^4$ .............................................. B60R 13/04
[52] U.S. Cl. .................................... 428/31; 428/192; 428/421; 428/463
[58] Field of Search .................. 428/31, 192, 421, 463

[56] References Cited

U.S. PATENT DOCUMENTS

| | | | |
|---|---|---|---|
| 3,325,344 | 6/1967 | Semancik et al. | 428/463 |
| 3,421,971 | 1/1969 | Kamal | 428/414 |
| 3,421,973 | 1/1969 | Kamal | 428/421 |
| 3,647,612 | 3/1972 | Schrenk et al. | 428/339 X |
| 3,908,070 | 9/1975 | Marzolf | 428/421 X |
| 3,982,780 | 9/1976 | Keith | 428/31 X |
| 4,091,138 | 5/1978 | Takagi et al. | 428/209 |
| 4,277,526 | 7/1981 | Jackson | 428/31 |
| 4,292,364 | 9/1981 | Wesch et al. | 428/284 X |
| 4,444,826 | 4/1984 | Sasaki et al. | 428/216 |
| 4,546,022 | 10/1985 | Madonia et al. | 428/31 |

*Primary Examiner*—Henry F. Epstein
*Attorney, Agent, or Firm*—Ostrolenk, Faber, Gerb & Soffen

[57] ABSTRACT

This disclosure provides a means for retarding or masking discoloration of polyvinyl chloride frame or flange for the windshield or other exposed external parts of a vehicle. The invention comprises a new constructive arrangement of a flange for windshields and guards of vehicles that consists in establishing an initial formation of a layer through extrusion of a flange in polyvinyl chloride, in a color that does not show the migration of rubber, this layer receiving on its outside surface a layer of P.V.D.F. (polyvinylidene fluoride), also known as Kynar TM, so that this layer has no direct contact with rubber, by reason of an extension of its side edges inside the extruded flange of polyvinyl chloride, which thereby forms a lateral covering of protection.

1 Claim, 2 Drawing Figures

FLANGE FOR WINDSHIELDS AND GUARDS OF VEHICLES

The present invention relates to a new constructive arrangement of a windshield flange and protective guard for vehicles, capable of preventing them from turning yellow in color, so common in today's practices.

In fact, for the formation of a flange for windshields and guards of vehicles, a flange of transparent polyvinyl chloride is used in the rubber moldings, with a layer of Mylar built-in, to offer a metal effect in all the peripheral area of the windshields and guards of the vehicles. Since the transparent polyvinyl chloride is sensitive to the sun's rays and its contact with rubber, a reaction to these causes it to become yellow and creates a displeasing appearance which has been the object of complaints by owners of vehicles.

Various studies have been conducted to obtain a flange to be placed in the windshields and guards of vehicles that does not present the problem of turning a yellow color after a certain period of time, that is, that the flange maintain a pleasing appearance for a long time; however, the difficulty faced was to obtain a metallized layer that would not suffer from the influence of both the sun's rays and contact with rubber, an element that must be used in the windshields and guards of vehicles.

In searching for a solution to this problem, it was possible to develop a new constructive arrangement of a flange for windshields and guards of vehicles that consists in establishing an initial formation of a layer through extrusion of a flange of polyvinyl chloride in a color that does not show the migration of rubber, this layer receiving on its outside surface a layer of P.V.D.F. (polyvinylidene fluoride) known by the trademark Kynar ® so that this layer has no direct contact with the rubber because of an extension of its side of the extruded flange of polyvinyl chloride which thus provides a side covering of protection.

BRIEF DESCRIPTION OF THE DRAWINGS

This new constructive arrangement will be described for better understanding in the following description and drawings in which.

Figure 1:
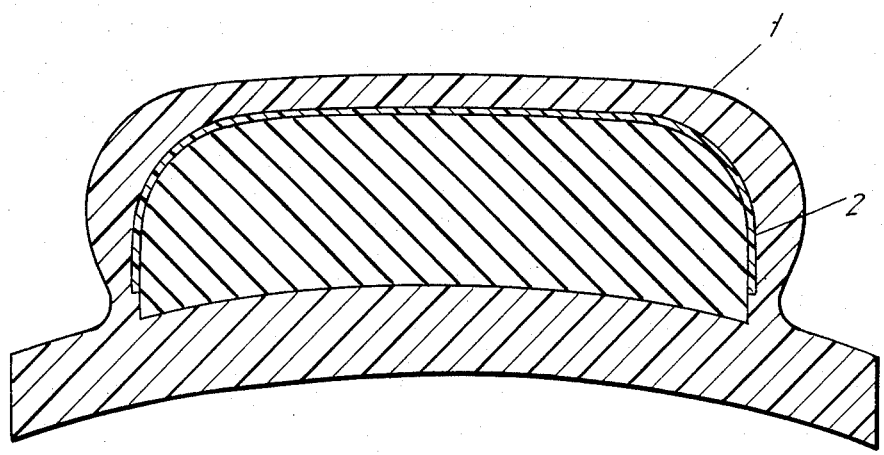
FIG. 1 is a cross-sectional view of a split flange in which the current technique of the prior art is used.

Referring first to FIG. 1 showing the prior art, the construction currently employed for a flange consists in using the in the rubber moldings a flange of transparent polyvinyl chloride (1) with a layer of built-in Mylar (2), giving a metallic effect in all the peripheral area of the windshield and protective guards; however, this transparent polyvinyl chloride layer is vulnerable to both the suns's rays and contact with rubber and after a period of time, takes on a yellow color, causing a poor impression and constant complaints.

Figure 2:
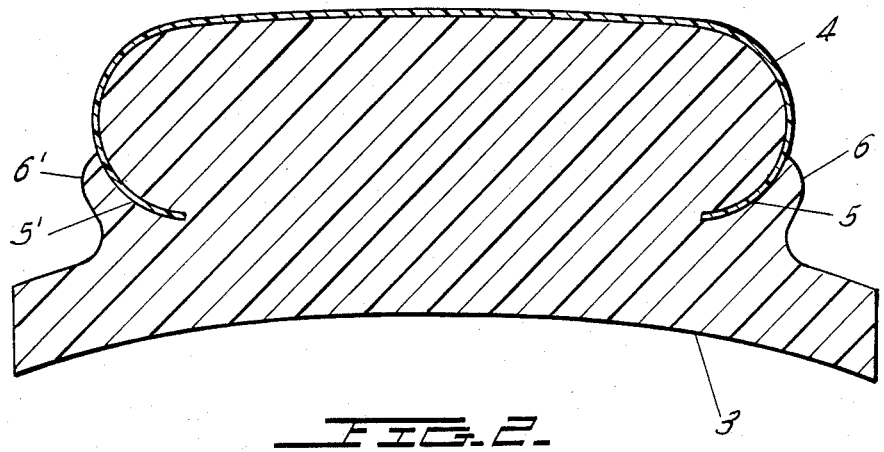
FIG. 2 is a corresponding cross-sectional view of a split flange in which the present invention is used in a new constructive arrangement.

In FIG. 2 there is shown the new constructive arrangement of the present invention of the flange for the windshield and guard of the vehicles. A layer is formed by extrusion of a flange in polyvinyl chloride (3) and a layer on the outside surface of P.V.D.F. (polyvinylidene fluoride) (4), also known as Kynar ®. This metallized layer is placed on the outside surface of the extruded flange and its side edges (5, 5') extend into the mentioned layer of extruded polyvinyl chloride so as to cause lateral borders (6, 6') of protection.

Under these conditions, since the metallized layer of P.V.D.F. (polyvinylidene fluoride), also known as Kynar ® is a noble material that does not suffer the influence of the sun's rays and remains under the effective protection from contact with rubber because of the adequate established extruded polyvinyl chloride, which in turn, does not suffer the influence of rubber, the flange so resulting in this new arrangement maintains an appearance of newness without becoming yellow.

I claim:

1. A flange for windshields and guards of vehicles having a first layer formed by extrusion of a flange of colored polyvinyl chloride which receives, on its outside surface, a second layer of metallized polyvinylidene fluoride; said second layer extending around the outside of said first layer and having its lateral edges extending into the inside of the first mentioned layer of extruded polyvinyl chloride, and second layer forming lateral borders of protection.

* * * * *